2,891,369
Patented June 23, 1959

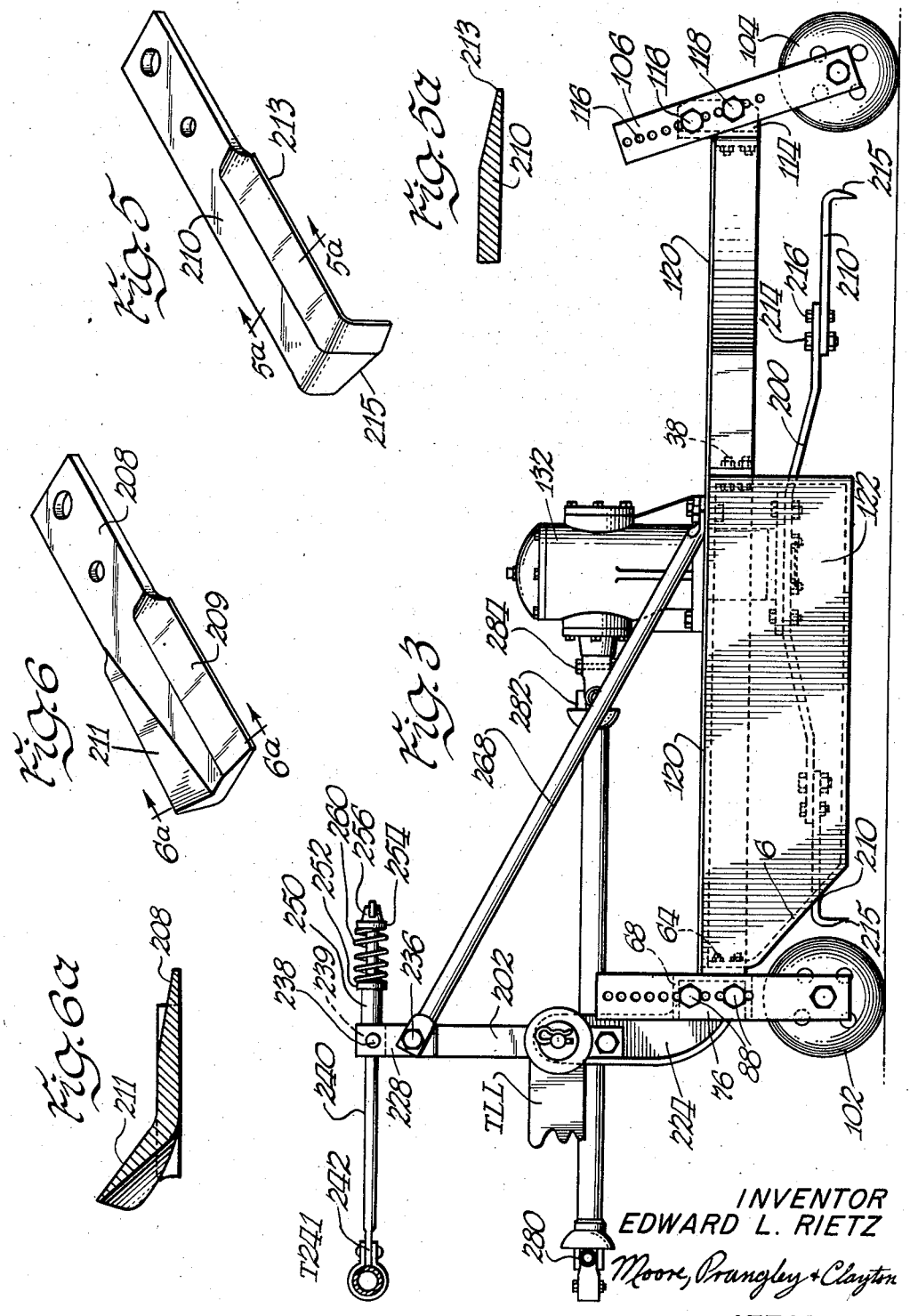

2,891,369

ROTARY SHREDDER AND CUTTER

Edward L. Rietz, St. Joseph, Mich., assignor to Auto Specialties Manufacturing Company, St. Joseph, Mich., a corporation of Michigan Application July 7, 1953, Serial No. 366,486

4 Claims. (Cl. 56—25.4)

This invention relates to a power driven tractor and more specifically to a driven rotary cutter and shredder and among the objects of the present invention are to provide a power operated rotary cutting and shredding mechanism and particularly such a device adapted to be attached to the power take-off device of a tractor or other land vehicle having a power take-off device, and which shredder and cutter is operable for cutting and shredding stalks including corn stalks, cotton plants, sorghum and tobacco stalks, for clearing brush land and pasture, and for topping beets, potatoes and other plants and vegetables. In addition, the device has great operability and value before and after harvest for shredding foliage and crop residues completely and for spreading the finely cut material so that it decomposes quickly and can be disked or plowed under easily to mulch the land. Also, the rotary shredder and cutter is advantageous and operable to cut stalks, vegetation, brush and garden residues, orchard trimmings and trash on the soil surface because the device not only cuts such vegetation but likewise beats and pulverizes the vegetation into bits and spreads the finely cut up material evenly over the surface for quick decomposition. In addition, this power driven shredder and cutter has great advantages for clearing weeds and brush from land to improve pasture. It disintegrates brush and growing plants and trees up to 2 inches in diameter and larger, and further cuts into small bits thick weed growth and puts these back into the soil to add nutrient value thereto.

Among the other advantages of the present invention are to provide a power driven shredder and cutter having a simple and ruggedly constructed and protective gear box mounting housing gearing operably disposed on the top of the larger housing that encloses the rotary blades and which gearing includes the provision of a rugged and simple gear transmission means within the housing for transmitting the power of a tractor or other power implement into rotary motion for turning the cutting blade disposed on the shredder and cutter in adjustable, relatively close position to the ground over which the shredder and cutter is propelled.

Another object of the invention resides in the construction of the cutters which are mounted to rotate about a vertical axis close to the ground and wherein the cutter bar construction itself is constructed for strength, resilience and resistance to breakage or bending against obstructions such as boulders, trees, stalks and the like.

Yet another object resides in the construction of the relatively low box-like casing enclosing the cutting and shredding blades which casing or housing is provided with spaced longitudinally disposed runners to support and guide the housing in its forward movement and which runners include means for confining the material to be cut and shredded within the zone of action of the cutting and shredding blades.

Yet another object of the invention resides in the formation of the cutting mechanism and particularly the blade portions thereof which are provided with sharpened, leading edges with the outermost portions thereof bent downwardly generally in the form of a hook to contact materials flat on the ground which would be ordinarily passed over by straight blades. In addition, the blades are provided with a turned-up edge on the trailing side of the cutter whereby to create suction to insure the elevation of plant stalks or residues into position where the same can be cut and shredded by the rotating cutter and whereby also the partially shredded or cut material is given more positive circulation into the path of the rapidly rotating cutting and shredding blade.

Yet another object of the invention is to provide a power driven cutter and shredder, particularly constructed and operable to be drawn by a tractor and operable from the power take-off shaft of the tractor and which cutter and shredder includes rotating blades of alloyed spring steel that do not require sharpening and will not shatter and wherein means is provided for preserving and protecting the blades by replaceable safety means which becomes immediately operable upon impact of the blades against an unyielding obstruction.

Yet another object of the invention resides in providing adjustable wheel or roller means upon which the device rolls over the ground, which roller means also adjustably regulates the height of the shredder blade to adapt the machine to variant crop or cutting and shredding conditions.

Yet another object of the invention resides in mounting the device on wheels or rollers which provide depth gauges for both the front and the rear of the device, thereby permitting it to follow the contour of the ground and thereby preventing the rotating, shredding and cutting blades striking the ground. In addition, an object of the invention likewise includes the provision of wheels, generally elliptical shaped in cross section and which wheels in a sense are almost spherical shaped in cross section thereby permitting ready side slipping or lateral sliding of the machine where sharp turning is desired or necessary.

Yet another object and advantage of the invention is the provision of means on the machine adapting the same for ready connection to a three-point hitch device and lifting system operable particularly by tractors and wherein slidable means is associated with the machine and includes mechanism to permit more uniform ground contact whereby, when the front of the machine raises to pass over ground irregularities, the rear portion of the machine is still operable to maintain contact with the ground contour.

Another object resides in the provision of the construction of the machine for attachment to a tractor or the like by connecting the mechanism including a shiftable or slidable linkage which provides smooth floating operation during use of the machine and wherein the connecting mechanism operates as a shock absorber when the unit is raised off the ground for transport of the unit.

Yet another object resides in the rugged construction of the housing which encloses a high speed rotating cutting and shredding blade and which housing is supported on rollers for moving along the ground and wherein the housing is not only ruggedly constructed but is formed with side members having groundward edges which are substantially wide and these wide spaced apart groundward edges may at times function substantially as sled runners and also act as a depth control means by insuring and maintaining a minimum distance between the shredder blades and the ground and also assists the machine in following the ground contour and at the same time function to confine the cut vegetation to the zone of action of the cutting and shredding blades.

Yet another object of the invention resides in the provision on the housing and framework of the machine, of a particular frame assembly providing a pair of horizontally spaced apart fastening connections at the upper portion of the housing and upwardly disposed centered fastening means including a slidable or longitudinally shiftable shock absorbing top link construction to permit more uniform ground contact when the device passes over ground irregularities, whereby to permit a smooth floating operation during the use of the machine and likewise to provide a shock absorbing means when the unit is raised, as by means of a three-point hitch lift mechanism, during transport of the unit by the power propelling means such for instance as a power operated tractor which has connections for the hitch device; to provide these and other objects of the invention as will be apparent from a perusal of the following specification when taken in connection with the accompanying drawings wherein:

Figure 3 is a side elevation of the cutting and shredding device;

Figure 4 is a section taken on line 4—4 of Figure 2;

Figure 5 is a perspective view of one of the cutter and shredder blades;

Figure 5a is a section on line 5a—5a of Figure 5;

Figure 6 is a perspective view of another form of cutter bar;

Figure 6a is a cross section on line 6a—6a of Figure 6;

Figure 7 is an enlarged vertical section through the gear box housing, on line 7—7 of Figure 2.

Figure 1:
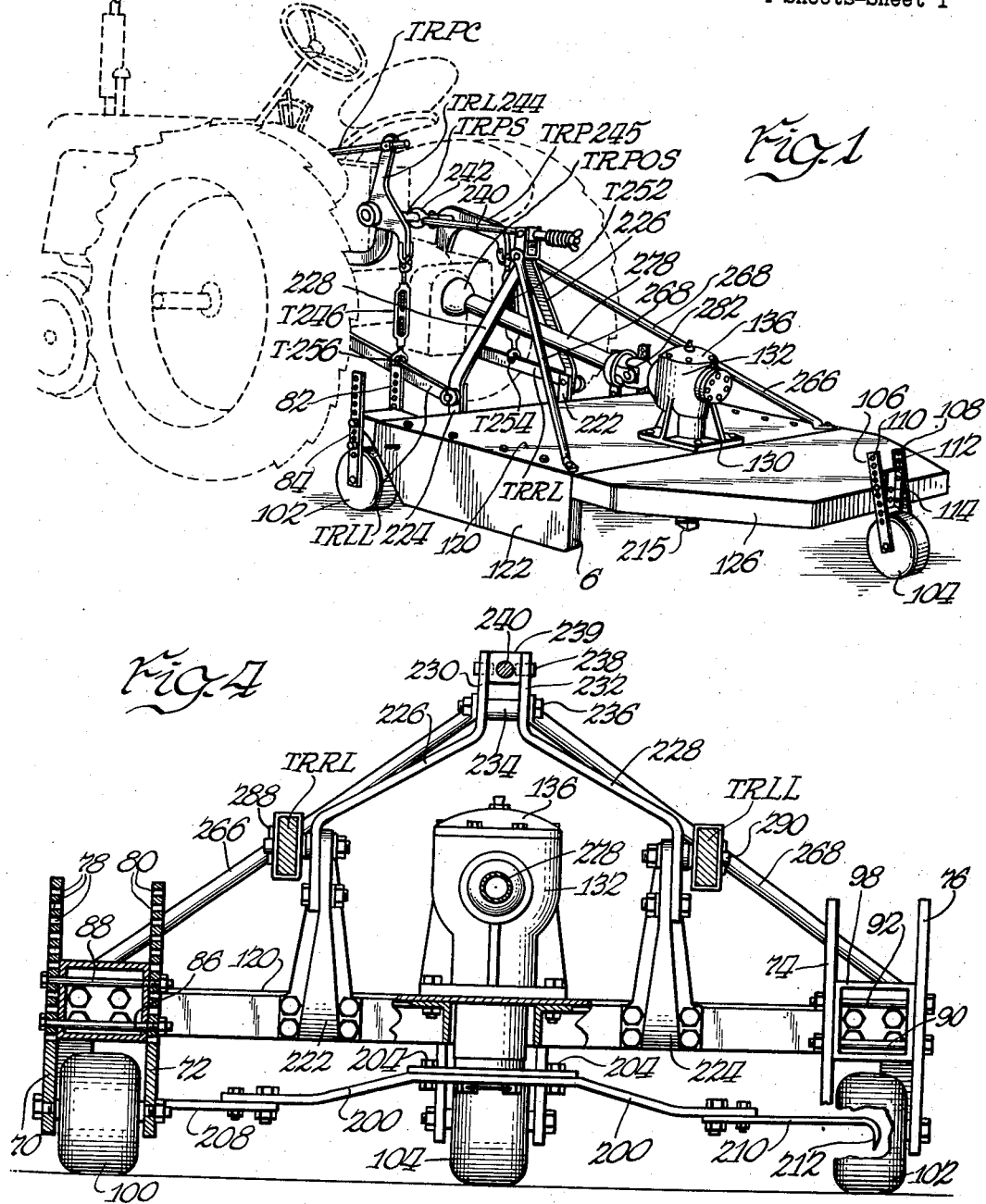
Figure 1 is a perspective view of the cutting and shredding device connected to the power take-off of a tractor.

Referring now to the drawings in detail, they disclose one form of the improved rotary shredder and cutter as propelled by a power driven tractor having a power take-off shaft. It is understood that the invention contemplates the utilization of any type of power mechanism for drawing the present shredder and cutter over the contour of the ground. However, for purposes of illustration the same is shown and/or described in connection with the power take-off device of a commercial type of tractor provided with a three-point hitch adapter mechanism which cooperates with certain lift mechanism of the rotary shredder and cutter machine for lifting the shredder and cutter machine from the ground for transporting the machine.

In the present application the cutter and shredder device is illustrated as being connected to a Farmall Super C tractor produced by the International Harvester Company but it is understood that the shredder and cutter device is operable from any tractor having a power take-off device suitable for connection to the power transmission mechanism of the shredder and cutter and is also operable from any tractor equipped with the 3-point hitch adapter generally illustrated and described herein but forming the subject matter of a separate application.

By reference to the perspective view of the device itself shown in the drawings as being pulled by the tractor, it will be noted that the device in general comprises a substantially box-shaped housing from the center of which ruggedly upstands a substantial heavy dome-shaped gear box which gear box in general includes a horizontal shaft with a bevel gear thereon connecting to another bevel gear mounted on the top of a vertical shaft which is disposed centrally of the gear box and terminates within the underside of the top of the housing in a driving connection to a horizontally disposed rotatable cutter mounted within the housing and operably disposed with relation to the ground to shred and cut crop residues, crops and the like when drawn over the ground as hereinbefore more generally stated.

The details of construction of the framework of the housing are shown in plan view and also in side and front view in Figures 1 to 4 inclusive of the drawing. In general, the framework comprises relatively heavy steel members which are welded and bolted to serve the function of protecting the operator and others from the rotating blades and also from flying debris. In addition, inner walls of this frame and its housing provide a baffle action for maintaining the brush or other material in the blade area. The centrifugal force of the blade thrusts the debris against the side walls of the frame and the housing where it is forced back into the blade area repeatedly until a fine shredded mulch is obtained.

Figure 2:
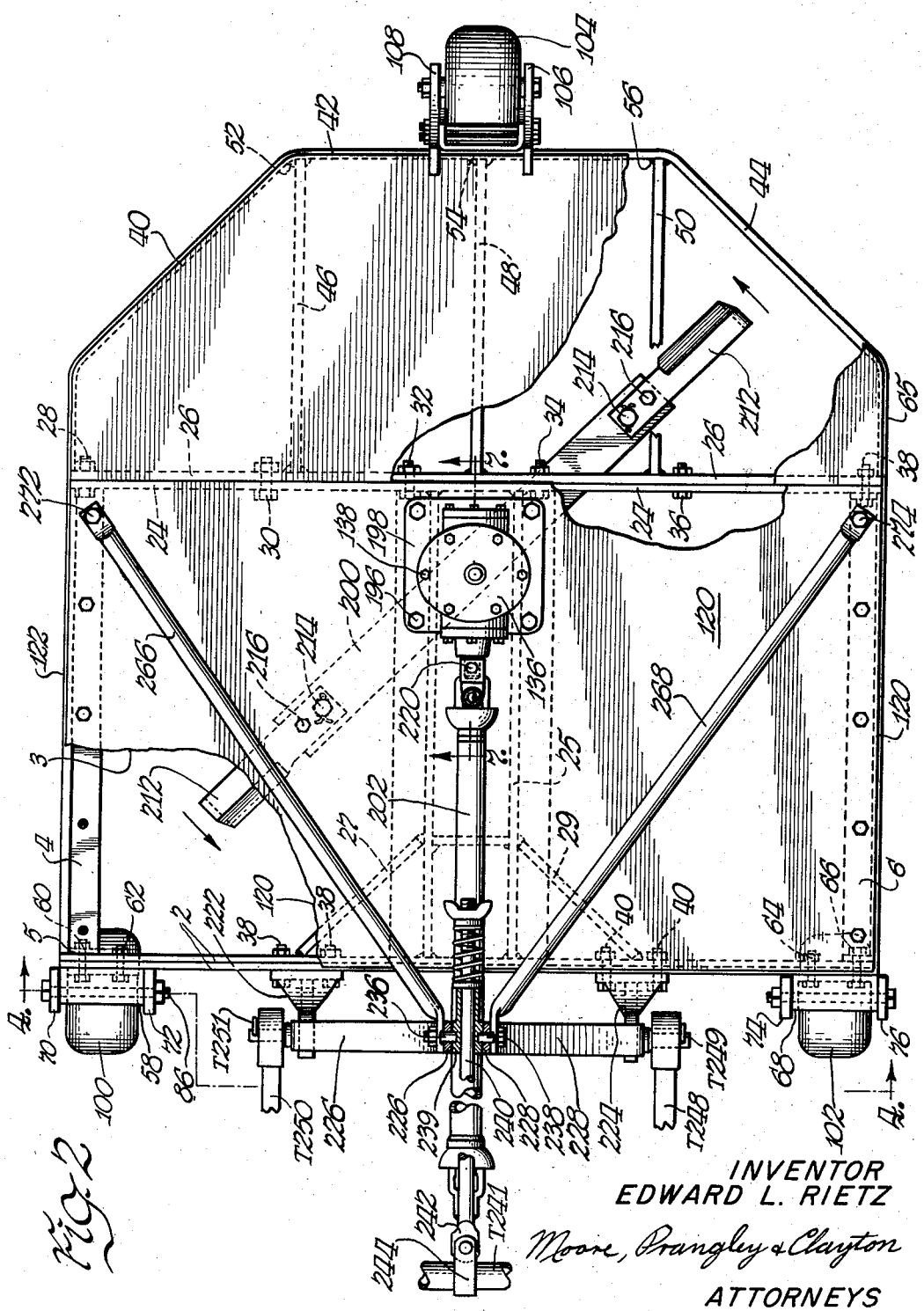
Figure 2 is an enlarged plan view of the cutter-shredder with parts being shown broken away.

As shown most specifically in Figure 2, the steel framework for the housing comprises a heavy steel front frame assembly consisting of a horizontal, front cross bar comprising preferably bolted together bars 2 which extend the full width of the machine. These bars 2 are preferably disposed edgewise vertically and support the front part of the rugged relatively stiff and rigid metal plate or cover 3 and are bolted together as shown. At the two front ends of these bars 2, are bolted two angle irons 4 and 6 in form similar to a sled runner. Each of these runners is of generally L-shaped construction and each provides a relatively broad flat bottommost sled runnerlike flange whereby the groundward portions thereof provide a wide ground bottom surface much like a sled runner. The flanged runner portions 4 and 6 extend substantially upwardly and provide a rigid connection to the opposite ends of the front frame members 2. At front and rear each one of these bars 4 and 6 may be provided optionally with a short rigidifying bar such as 5 and 7. These rigidifying members facilitate the bolting together of these runner bars 4 and 6 and to the front and rear frame members presently to be described and, in addition, provide at the front particularly rigid and rugged means to which the front wheel bracket or carriage assemblies are attached, as will hereinafter be described.

The front frame bar 2—2 and a like rear frame bar 24—26 are rigidified by a longitudinally extending frame 25 welded at its front and rear ends to said front frame member 2—2 and to the rear frame members 24 and 26. In addition, diagonally extending struts or brace members 27 and 29 are welded to front frame members 2—2 and to the longitudinal sides of frame 25.

The front and rear frame members 2—2 may be either a single elongated relatively thick strip of sufficient thickness or rigidity or, if desired, may be formed as the pair of strips 2, 2 and 24 and 26 assembled side to side and bolted together as shown and adapted to receive thereover the metal plate 3. By this means a relatively rigid box-like housing and top for supporting the gearing housing and other mechanism is provided.

Parallel to the front horizontal frame members 2 are disposed the rear runner frame members 24 and 26 similar in construction, strength and ruggedness to the front vertically extending frame members 2. These members 24 and 26 preferably extend the entire width of the machine from the side members 4 to the side frame members 6. These rear frame bars 24 and 26 are arranged in horizontal extending relation and are bolted together at intervals therealong as shown by means of bolts 28, 30, 32, 34, 36 and 38 which bolts extend in spaced relation thereon as shown. Each of these bolts just described has threaded thereto a nut for clamping the frame members 24 and 26 together. Certain of these bolts likewise pass through spacing and reinforcing members and also serve to hold the frame members 24 and 26 to the side frame members 4 and 6. If desired, welding can be provided at the corners to further solidify and rigidify the frame members.

In addition to the frame assembly just described, there is also provided a rear frame assembly comprising a bar or frame member 40 likewise formed of heavy steel horizontally extending which extends from the side frame member 4 in the same direction and then diagonally inwardly as indicated in the drawing, and thence in a parallel direction as at 42, which is parallel to the frame members 24 and 26 centrally of the rear frame assembly, to the opposite side of the device wherein this frame member 40 extends forwardly and outwardly as at 44 diagonally as shown and terminates in a leg member 65 in the plane of and welded or otherwise to the rear end of the frame member 6 of the forward frame assembly just described. This rear frame assembly bar 40, 42 and 44 is disposed in a vertical position for rigidity and provides a rearward extension for the housing which supports and encloses the shredding mechanism. This rearward extension also supports the rear wheel or roller hereinafter described. This rearward extension frame is reinforced, rigidified and strengthened by means of rearwardly and longitudinally extending steel frame bars 46, 48 and 50 which connect the consolidated cross frame members 24 and 26 with the rear bent bar sections 40, 42 and 44. The ends of these longitudinal reinforcing frame members 46, 48 and 50 are welded as at 52, 54, 56 to the bent bar 40 and to the two bolted together bars 24 and 26 as shown, whereby to provide a rigid rear frame assembly.

The bolted together bars 2 hereinbefore described provide means for supporting a plurality of brackets longitudinally of and spaced along these bars 2. One of these brackets is shown at 58 and is bolted at spaced central points by two bolts 60 and 62 and the other front brackets 68 is secured by bolts 64 and 66. Each such bracket 58 and 68 is cradle-shaped for ruggedness. These two cradle-shaped mountings 58 and 68 are bolted to the front interbolted strips 2 to provide rigid mounting means to which elongated vertical strips or brackets of metal 70, 72, 74 and 76 are adjustably connected. These two vertical brackets or strips are shown at 70 and 72 at the front right-hand portion of the machine and 74 and 76 at the left-hand portion of the machine. These vertical brackets or strips are provided with a vertically spaced series of adjustment holes 78, 80, 82 and 84 and these adjustment holes are adapted to receive a pair of bolts 86, 88, 90 and 92 which pass through selected holes of the space holes 78 and 80 in the vertical strips 70, 72, 74 and 76 whereby adjustably, vertically to support the strips 70 to 76 in position from the C-shaped brackets 58 on one side of the front of the machine and 68 on the other side of the machine front. At their bottom ends, these vertical brackets 70 and 72 and 74 and 76 are provided with registering apertures through which pass axle pins for a centralized hub or bearing 96 and 98 in the front wheel 100 and the opposite front wheel 102. By means of these vertically elongated wheel carrying strips 70, 72, 74 and 76 the two front wheels are vertically adjustable with respect to the C-shaped brackets affixed as described to the front corners of the front framework 2, 2 and the housing thereof, whereby to regulate the height of the shredding and cutting blades from the ground to suit crop cutting and shredding conditions.

The central portion 42 of the rear frame member of the machine is likewise supported by a centralized wheel or roller 104 which may be of similar construction or which may comprise an elongated roller. Where the roller is of similar construction it is provided with relatively long, upwardly extending, spaced apart strips 106 and 108 provided with vertically extending series of adjustment holes 110 and 112 whereby the two strips may be adjustably bolted to a centralized bracket 114 bolted in turn to the central rear strip 42. For the rear of the machine, the two bracket flanges are provided with bolt holes which may be disposed either diagonally thereof and/or vertically thereof whereby the brackets 106 and 108 may be either adjustably mounted to extend in a true vertical direction or maybe adjustably mounted in an inclined direction as shown in Fig. 3.

Housing means is provided for enclosing the rotatable cutting and shredding blades and for confining the vegetation to be cut substantially within the zone of action of the cutting blades and for likewise properly distributing and spreading the shredded vegetation over the ground. In addition, the housing projects the operator and forms a top support for the gear casing, the three-point hitch and the adjustable supporting wheels for regulating the cutting blade with respect to upstanding crops.

The housing is formed of substantially heavy metal plate to provide a rigid supporting surface for supporting such just described mechanisms. Preferably a substantialy low enclosing casing having a preferably flat top and depending apron-like sides is provided as an enclosure for the centralized rotating blades and providing a housing means comprising the side sled walls 122 and 124 for confining the material to be cut, closely within the influence of these rotating blades. A rigid malleable iron housing for the gearing herein described extends upwardly through an opening in this housing cover and extends upwardly thereabove as shown in the drawings. This steel plate housing thus provides an additional rigidifying and reinforcing member for the rigid framework that carries the rotatable cutting blades, the adjustable wheels and the upright yoke forming a part of the connection with the tractor hitch mechanism. The rear wheel may be either a single wheel like the front wheels or it may comprise an elongated roller of the same diameter or of smaller diameter than the front wheels.

With respect to the cover plate 3 the same extends over the entire top of the framework 2, 4, 6, 40, 42, 44 and 65 hereinbefore described and depends downwardly as at 122 and 124 to cover the runners 4 and 6 and to provide around these runners 4 and 6 vertical aprons. At the front and top and over the runners the side portions of the housing provide an all-steel heavy duty reinforcing covering for the framework hereinbefore described and also an overall rigid protective housing construction. At the extreme front and rearwardly of the side runners the housing preferably comes down only part way as at 126 sufficiently to cover the sphere of action of the rotating cutting blades. The housing sides 126 rearwardly of the runners preferably do not extend downwardly as far as they do over the runners, so as to permit the escape of the shredded and cut vegetation that is shredded by the rotating blades. Also at the front the housing apron is normally sufficiently elevated to permit free entry of uncut crop portions to within the sphere of action of the rotating, cutting and shredding blades. Rearwardly of the blades the housing apron permits easy discharge of the cut and shredded crop residues and their distribution back to the soil.

The heavy metal housing is adapted to surround a propeller type cutter and shredding blade preferably of alloy spring steel of sufficient length to cut the desired diameter of swathe. In the present instance the length of these steel blades is sufficient to cut a five-inch swathe. These blades are preferably constructed so that they do not require sharpening and will not shatter and they are provided with extra heavy anchor bolts and shear pins for tough cutting.

In order to provide such a horizontally disposed rotary cutter, there is preferably mounted substantially in the longitudinal central plane of the plate 3 an upstanding turret-like malleable iron gear housing 124 which comprises generally a horizontal metal plate 130 from which upwardly extends that part of the turret-like housing 132 which is disposed above the horizontal plane of the metal deck or top 3 of the combined cutting and shredding machine. This turret 132 is preferably formed with a lower metal casting and is provided with an upper cap 136 which is flanged and bolted as at 138 to a top flange 140 of the turret casting 132. This casting is preferably of malleable iron and constitutes a gear box. The top is preferably provided with an oiling mechanism 142 of any desired construction and placed appropriately thereon. In addition, this gear box assembly is provided with openings at its opposite diametrically disposed faces, one of which is normally closed by means of a circular plate 144 secured by means of bolts 146 the inner ends of which engage the body of the housing.

The diametrically opposite side of the housing is normally closed by a ring-like casting 148 having a central opening 150. So also the top of this gear box housing is provided with a relatively large opening 152 closed normally by the top cover 136. In the horizontal opening 150 and the opposed opening, closed normally by the cap 144, is disposed a horizontal shaft 152 one end of which 154 is supported by bearings 156 in a circular opening of the turret housing. The other end of the shaft 152 normally supports a bevel gear 160 rotatable therewith and provided with bevel teeth 162 which teeth in turn mesh with the teeth 164 of the bevel gear mounted to rotate with a vertical shaft 168 rotatable within a sleeve-like bearing 172 in the cylindrical hollow portion of the aforesaid housing. The bottom portion of the housing as at 174 houses a ball bearing means 176 in which rotates the lower end of this vertical shaft 168. The bottom portion of this shaft contains an enlargement collar 180 which likewise is journalled by a ball bearing 182 mounted in the lower end 184 of the vertical barrel of the housing. An oiling fitting 186 is appropriately placed to supply these two bearings 176 and 182 with lubricant.

The bottom portion of the shaft is provided with a vertical output shaft connector 188 reference to which will be hereinafter made. The flange member 130 of the turret housing is provided with a series of vertically disposed bolt receiving openings 190 therearound by which the collar of the turret pedestal may be securely bolted in position by means of a series of bolts 194 and 196. There are approximately six of these bolt fasteners shown. The horizontally disposed shaft 152 has an outer end 202 which projects beyond the external wall of the closing cap 148. This is the input shaft of the gear shaft assembly and is connected to the power take-off shaft of the tractor or other propulsion means for the combined shredding and cutting device. This horizontal shaft 152 is surrounded by an inwardly disposed ball bearing mounting 206 for the enlarged inner end of the shaft and by an additional ball bearing 206 for the outer portion of the shaft located just inwardly of a circular flange 208' on the housing closure. Under this construction when the end 202 of the input shaft of the gear shaft assembly is connected to the source of power, through the intermediary of the meshed gears 162 and 164 the vertical shaft 168 is rotated at relatively high speed.

The combined cutting and shredding blades hereinafter described are mounted directly on the lower end of the collar 188 of the vertical output shaft 168. This collar 188 is provided with desired bolt holes or other receiving means for fasteners for connecting the cutting and shredding blades to the rotatable shaft 168 in a manner such that the combined cutting and shredding blade may be rotated about a horizontal plane and sufficiently close to the ground or to the growing crop as may be desired.

The raising and lowering of the elevation of the machine housing in general by means of adjustment interconnecting the frame with the wheels or rollers on which the gear housing is carried provides a desirable adjustment for raising or lowering the elevation of the rotatable cutter with respect to the ground level or the growing crop level to cut the latter in the desired horizontal plane.

Affixed to the rotary collar 188 of the vertical driving shaft of the hereinbefore described gear box is a rotary shredder and cutter bar which preferably comprises an inner member 200 and a shredder bar support 202' which is provided centrally with two circular series of spaced apart bolt holes which are adapted to register with a similar series of bolt holes provided in the member 209, the spacer and the shredder bar member 200 being superimposed one upon the other and secured by the bolts 204' in the bolt holes spaced circumferentially and concentrically about the shaft 168 and in the collar 188. Tie wires 206 are provided for preventing the accidental loosening of the bolts which are secured to the collar 108. The shredder bar spacer 202' thus is driven in a horizontal plane at the bottom end of the turret housing and by the vertical shaft 168 which is power driven from the tractor or other power driven device.

The shredder bar member 200 is constructed of special heat treated spring steel for strength and to provide resilience during operation whereby to prevent breakage or permanent bending when boulders, tree stumps and stones are encountered during the operation of the cutter. Secured to each end of the shredder bar member 200 are shredder and cutter blades 208 and 210.

Two types of blades are shown. For instance, the shredder blade 208 of Figures 6 and 6a may be used. It is provided with a leading, downwardly beveled cutting edge 209 on the forward or leading side and has a turned up edge 211 on the trailing side of the blade to create suction or the blade construction may be like that shown in Figures 5 and 5a which illustrates a hook shaped blade.

Preferably in the present machine it is desired to use shredder blades 210 formed as hook-shaped blades each having a sharpened leading edge 213 with the outermost portion of the blade bent downwardly in the form of a hook as at 215. The bottom of the hook 215 lies spaced from but positioned substantially closer to the ground than the main horizontal portion 210 of the blade. This hooked construction of the blade permits contact of the blade with the material lying flat on the ground which material would ordinarily be passed over if the blade be of the straight type. If desired the downturned edge 215 of the blade 210, see Fig. 5, may be formed with an edge that lies straight across the bottom and is not upwardly beveled at the trailing edge as is shown at 215 in Fig. 5.

The shredder blades 208 or 210 are mounted on the opposed opposite ends of the shredder bar member 200 by means of two bolts 214 and 216. The innermost bolt 214 is a large, heat treated bolt which acts as an anchor or pivot for the outer ends of the blade. The second smaller and outermost bolt 216 is designed to function as a shear pin connection when the blade contacts a load or an obstacle which presents a load greater than the capacity for which the machine is designed. In this event the shear pin connection 216 will break, permitting the blades to swing inwardly around the inner pivot bolt 214 to clear the resisting object or objects. This safety feature protects the gear box drive shaft and also the power take-off shaft of the tractor or other power source.

In addition to these two protective devices, an additional shear bolt 220 interconnects the universal drive shaft assembly hereinafter described with the power input shaft 202 of the gear box assembly to provide an additional safety feature for the upper part of the power drive. The frame assembly, including the metal housing overlying the top of the frame and extending downwardly substantially as shown in the drawings, is formed of heavy steel which is welded and bolted to protect the operator and others from centrifugal debris and shredded particles. It has another function, to wit, that of providing means of assisting in shredding the brush or other material being cut or cleared. The inner wall construction of the frame assembly, and particularly the depending vertical walls thereof, provide a baffle action which maintains the brush or other material within the blade area.

The centrifugal force of the high speed rotating blades thrusting the cut material against the inner walls of the housing forces the cut material back into the zone of action of the rotating blade, repeatedly, until a fine shredded mulch is obtained. This mulch is then and thereafter scattered by the action of the machine over the ground where it contributes materially to the enrichment of the soil. The vertical apron members of the frame assembly and housing are constructed so that the groundward runner members, which are relatively wide and similar in action to a sled runner, function in addition to acting as a beveled support to assist in supporting the cutting and shredding machine on the ground, act also as a depth control by maintaining a minimum distance between the shredder blades and the ground. In addition, these sled-like runners assist in allowing the machine to follow the contour of the ground.

In constructing the present type of rotary shredder and cutter for adaptation to the employment of a three-point hitch system, a pair of bracket members 222 and 224 are bolted by the bolts 38, 40 to the front frame members 2 of the machine. These brackets 222 and 224 extend somewhat outwardly and upwardly as shown and are provided at their upper ends with bolt openings to receive the "A frame" assembly comprising a pair of inwardly and upwardly bent bars 226 and 228 which converge upwardly and inwardly with parallel spaced apart upper portions 230 and 232 disposed outwardly and upwardly of the top deck of the machine. A suitable spacer 234 and bolt means 236 provide a rigid upper end for these spaced apart frame assembly members which receive therebetween the trunnion block 239 having the outwardly extending axles or pivotal members 238 which pivot in registering holes in the upstanding ends 230 and 232 of the frame assembly.

Mounted in this trunnion block is an elongated rod which is designated as a top lift link 240. This rod or link is provided on one end with a flattened portion 242 formed with an aperture to receive a clevis attachment 244 which is secured to the end 242 of the link by means of a bolt and nuts and lock washer. This clevis 244 in turn is rigidly clamped to the power driven lift shaft 241 of the tractor which shaft provides power means in combination with the three-point hitch hereinafter described for bodily raising the shredder and cutter from the ground for transport purposes. The rod or link 240 is longitudinally shiftable relatively to the trunnion block 239, more specifically it is capable of sliding longitudinally through the trunnion block 239 which trunnion block in turn is provided with oppositely extending pivotal axles 238 which pivot in registering holes in the upper ends of the arms 230 and 232 of the "A frame" assembly. The rear end of the trunnion block is provided with a spacing sleeve 250 on which is formed a collar 252. A spring 260 between the collar 252 and a washer 254, secured by a wing nut 256, tends normally to force the rear end of the rod longitudinally rearwardly of the trunnion when the spring is under compression.

Frame members comprising a pair of rigidifying brace rods 266 and 268 are provided for rigidifying the "A assembly" frame. These rods are provided on their upper forward end each with a perforation to receive therethrough the bolts 236 and 238. These rigidifying braces 266 and 268 extend downwardly and are bolted by a top bolt 272 and an opposite top bolt 274 which extends vertically through the top metal cover plate and into the side frame members.

Connected to the standard power take-off drive shaft TRPOS of the conventional tractor or other source of power is a universal drive shaft assembly 278 which has the universal joint 280 at its forward end and an additional universal joint assembly 282 at the opposite end which is connected at 284 by means of a proper clevis and bolt 220 to the power input shaft 152 of the upstanding gear box assembly 132 of the cutter and shredder.

In addition, the two upstanding frame assembly members 226 and 228 of the "A frame" assembly are bolted at their bottom portions to the upstanding brackets 222 and 224 at the front of the machine and also pivotally connected thereto by means of the hitch pin devices 288 and 290 are the usual side links TRLL and TRRL. These hitch pin devices 288 and 290 likewise include suitable detachable hitch pin keys. Thus the shredder and cutter device is pivotally connected at 288 and 290 to the standard rearwardly extending tractor links TRLL and TRRL at spaced pivotal connections below and also rigidly connected by means of the rod 240 to the turnable power lift shaft TRPS, which latter shaft in turn is controlled from the tractor driver's seat by the pivoted links TRL244 and TRR245. Hence upon power shifting the tractor power control TRPC from the driver's seat of the tractor, the links TRL244 and TRR245 are shifted by power to turn tractor shaft TRPS and through rod 240 and pivoted tractor links TRLL and TRRL and connections to the shredder and cutter machine, the latter will be raised by the power of the tractor for transportation or otherwise.

The three specially designed wheels or rollers hereinbefore described are mounted vertically adjustably either upwardly or downwardly and provide depth gauges for the front and also the rear of the machine. In addition to acting as a depth control gauge and mounting for the cutter bars, the wheels provide means for permitting the machine to follow the contour of the ground and for preventing the shredder blades from striking the ground. The wheels, in addition to functioning as both depth gauge control and spacing means for preventing the rotating blades striking the ground, because of their elliptical or almost spherical shape, are designed to slip or slide laterally where sharp turning of the machine is desirable.

The three-point hitch adapter means is thus mounted on and adjacent the top of the machine, whereby the machine is employable with a three-point lift system and particularly with the three-point hitch disclosed herein. The present combined cutting and shredding machine, when interconnected with a tractor by means of said three-point lift system, may be instantly power elevated sufficiently from the ground for transportation or other purposes.

The invention is hereby claimed as follows:

1. A power operated mobile shredding and cutting apparatus comprising a frame structure generally horizontally disposed, generally flat top panel means covering said frame structure, a pair of wheel assemblies respectively connected with and supporting opposite leading corners of said frame structure so that material to be acted upon may freely enter beneath a leading margin of said frame structure and said top panel means, wheel means connected with a trailing portion of said frame structure for further supporting the frame structure, a gearing housing mounted on said frame structure and including upper and lower portions respectively extending substantially above and below said top panel means and an intermediate flange overlying said top panel means and portions of said frame structure and secured to said portions of the frame structure, gearing means disposed in said housing, a power transmission shaft extending from said gearing means for connection to a power shaft terminal of a mobile prime mover, a pair of bearing means respectively mounted in said upper housing portion and in and adjacent a lower end of said lower housing portion, a vertical shaft connected with said gearing means and rotatably supported by said pair of bearing means and having a lower end terminating adjacent said lower end of the lower housing portion, cutting blade means secured to and extending radially from said lower end of the vertical shaft, said housing and said vertical shaft being disposed substantially centrally of said frame structure, and opposite side wall means on said frame structure and depending from and substantially below said top panel means and extending rearwardly from adjacent the leading margin of said frame structure and terminating generally centrally of longitudinal sides of the frame structure for confining material to be cut and then releasing the cut material.

2. An apparatus, as defined in claim 1, wherein said cutting blade means comprises a relatively rugged bar secured to said vertical shaft and having portions projecting radially in opposite directions from said vertical shaft, separate blade members respectively pivotally connected with opposite ends of said bar, and shear pin means normally retaining said blade members in generally radially extending positions.

3. An apparatus, as defined in claim 1, wherein said opposite side wall means include relatively broad lower margins having upwardly inclined leading ends for providing ground engageable runners.

4. An apparatus, as defined in claim 3, wherein said wheel assemblies and said wheel means include support brackets vertically adjustably connected with said frame structure.

References Cited in the file of this patent

UNITED STATES PATENTS

| | | |
|---|---|---|
| 1,227,090 | Tanczer | May 22, 1917 |
| 1,742,563 | Stidger | Jan. 7, 1930 |
| 2,573,221 | Romig | Oct. 30, 1951 |
| 2,592,991 | Yeager et al. | Apr. 15, 1952 |
| 2,609,215 | Hancock | Sept. 2, 1952 |
| 2,621,457 | Rosenberg | Dec. 16, 1952 |
| 2,649,678 | Sishc | Aug. 25, 1953 |
| 2,685,160 | Kuhary et al. | Aug. 3, 1954 |
| 2,706,441 | Caldwell et al. | Apr. 19, 1955 |